E. HUNTER.
GARDEN WATERING-POT.
No. 190,218.                      Patented May 1, 1877.
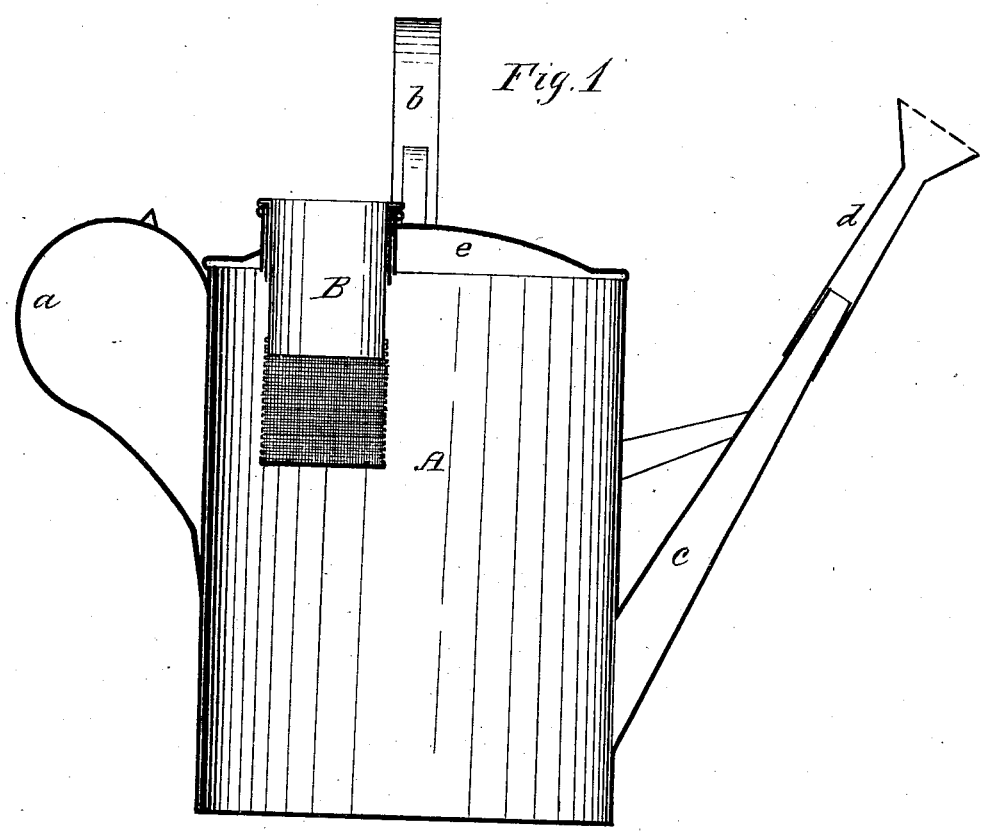
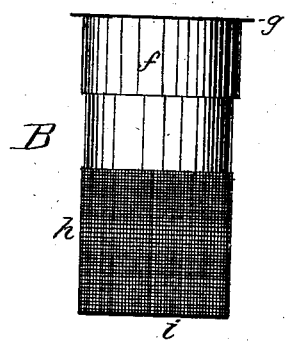
WITNESSES:                     INVENTOR.
Edward Hunter
per Chas. H. Fowler,
ATTORNEY.

UNITED STATES PATENT OFFICE.

EDWARD HUNTER, OF NORWICH, CONNECTICUT.

IMPROVEMENT IN GARDEN WATERING-POTS.

Specification forming part of Letters Patent No. 190,218, dated May 1, 1877; application filed June 11, 1875.

*To all whom it may concern:*

Be it known that I, EDWARD HUNTER, of Norwich, in the county of New London and State of Connecticut, have invented a new and valuable Improvement in Garden Watering-Pots; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a sectional view of a garden watering-pot with my invention attached. Fig. 2 is a detached view of the filtering-cup or strainer.

Previous to my invention there was not, so far as I am aware, any provision made whereby the water could be filtered or strained previous to its entering the watering-pot. The great objection to the watering-pots now in use is the continued clogging or stopping up of the rose-head or the wire-gauze placed over the opening of the spout or nozzle by the foreign matter contained in the water.

The object of my invention, therefore, is to provide a means whereby the water, before entering the pot, is relieved of all foreign substances, thereby insuring the free discharge of the water through the perforations in the rose-head; and consists in a suitable strainer, sieve, or filter placed at the opening where the water is introduced in filling the pot, as will be hereinafter more fully described.

In the drawings, A represents the body of an ordinary watering-pot, provided with the usual handles $a$ $b$, and spout or nozzle $c$, to which a rose-head, $d$, is connected. These parts do not differ materially from those of the garden watering-pots now in common use, excepting that the top of the body A is closed by a cover or plate, $e$, having an opening of sufficient size to allow the insertion of a straining or filtering cup, B. The body $f$ of this cup may be made of sheet metal, and formed at its upper edge with an outwardly-projecting flange, $g$, which rests upon the cover $e$ when the cup is in place. The lower portion of the cup is preferably composed of fine wire-gauze $h$, soldered or otherwise secured to the lower rim of the body $f$, and to a solid metal bottom, $i$; or, if desired, the cup may be formed entirely of sheet metal, and perforated upon its sides to take the place of the wire-gauze, and may be made stationary by securing it firmly to the cover or plate $e$, the cover $e$ being removable in place of the cup.

By the use of a filter or strainer at the opening where the water is introduced, it will be seen that all foreign substances are prevented from entering the pot, and the possibility of the clogging up of the rose-head and nozzle is entirely prevented, thereby dispensing with screw rose-heads, which have heretofore been found necessary in order to remove the same for the purpose of cleaning, such construction of rose-heads greatly increasing the cost of manufacture, besides making the watering-pot more liable to leak.

Having now fully described my invention, what I claim as new, and desire to secure by Letters Patent, is—

As a new article of manufacture, a hand garden watering-pot provided with a filter, sieve, or strainer at the opening where the water is introduced, to strain out solid matter from the water and insure its free discharge at the rose-head, substantially as and for the purpose specified.

In testimony that I claim the above I have hereunto subscribed my name in the presence of two witnesses.

EDWARD HUNTER.

Witnesses:
JAS. B. COIT,
NICHS. TARRANT.